July 8, 1958  E. G. BURNS  2,842,087
PRESSURE INDICATOR
Filed Jan. 4, 1957  2 Sheets-Sheet 1
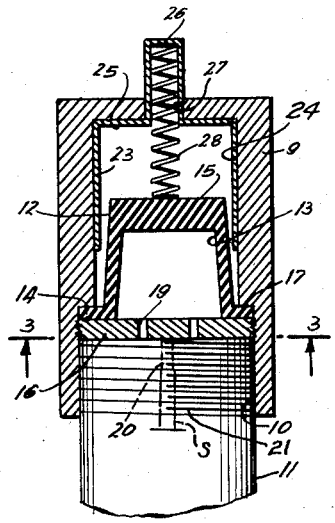
FIG.1
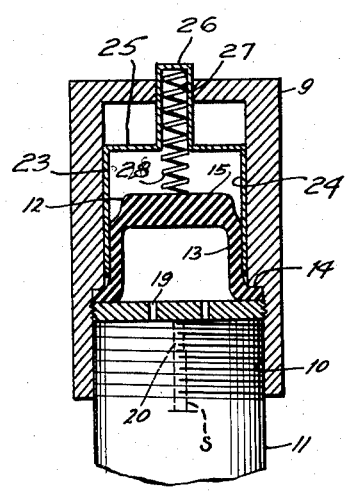
FIG.2
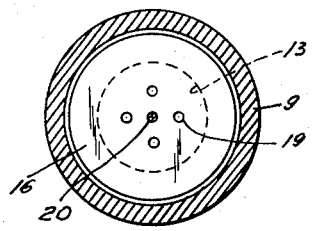
FIG.3
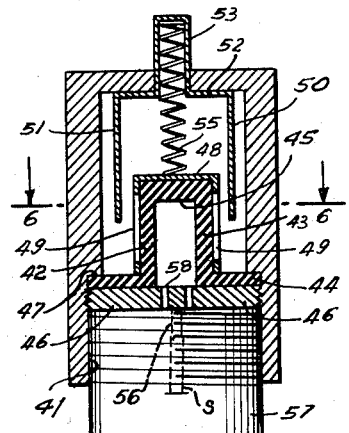
FIG.4
FIG.5
INVENTOR.
EDMUND G. BURNS
BY
Clark & Ott
ATTORNEYS

INVENTOR.
EDMUND G. BURNS
BY

ATTORNEYS

United States Patent Office 2,842,087
Patented July 8, 1958

2,842,087
PRESSURE INDICATOR
Edmund G. Burns, Brooklyn, N. Y.

Application January 4, 1957, Serial No. 632,581

6 Claims. (Cl. 116—34)

This invention relates to a pressure indicator for pneumatic tires.

An object of the invention is to provide a pressure indicator in the form of a cap for the valve stem of a pneumatic tire which cap is constructed and arranged to visually indicate the pressure in the tire.

Another object of the invention is to provide a tire pressure indicator in which the indicator member is moved into position for visual inspection upon decrease of the pressure in the tire beyond the predetermined limit.

Another object of the invention is to provide a pressure indicator of said character in which the indicator member is arranged in inwardly directed relation when the tire is inflated and is disposed in outwardly projected relation when the tire is underinflated.

Still another object of the invention is to provide a tire pressure indicator in which an indicator member is retained in retracted relation by a resilient body under pressure from the tire and in which the indicator member is relieved from engagement with the resilient body and is moved out of engagement therewith when the tire becomes underinflated.

With the foregoing and other objects in view, reference is now made to the following specification and accompanying drawings in which the preferred embodiment of the invention is illustrated.

In the drawings:

Fig. 1 is a vertical sectional view of a pressure indicator constructed in accordance with the invention and showing the same with the indicator member in outwardly exposed relation.

Fig. 2 is a similar view showing the indicator member in inward relation.

Fig. 3 is a cross-sectional view taken approximately on line 3—3 of Fig. 1.

Fig. 4 is a vertical sectional view of a modified form of pressure indicator showing the indicator member in outwardly exposed relation.

Fig. 5 is a view similar to Fig. 4 and showing the indicator member in inward relation.

Figure 6:
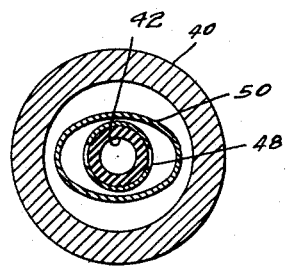
Fig. 6 is a cross-sectional view taken approximately on line 6—6 of Fig. 4.

In the several forms of the invention illustrated in the drawings, the pressure indicator includes a cap having a threaded end adapted to engage the threaded end of the usual valve stem of a pneumatic tire and the like and with an indicator member adapted to engage a resilient expandable member located within the cap and which is expanded by the pressure in the tire. The indicator member is retained in inward relation by the expandable member when the tire is inflated and is projected into outward visible relation when the tire is underinflated.

In the form of the invention illustrated in Figs. 1 to 3 inclusive of the drawings, the cap 9 is interiorly threaded as at 10 for threadedly securing the same on the valve stem of a pneumatic tire and the like. The valve stem 11 is of the usual construction having a valve with a valve pin S for closing off the flow of the air from the tire and which permits of the movement of the valve into open relation by the pressure of the air when inflating. Located within the cap 9 is a hollow resilient member 12 provided with an expansible and contractible peripheral wall 13 having a peripheral flange 14 at the open end thereof and with a relatively thick end wall 15. The resilient member 12 is retained in position in the cap by means of a disk 16 threadedly engaging the interiorly threaded portion 10 of the cap. The peripheral wall 13 is spaced from the cap and the peripheral flange 14 is compressed by the disk 16 against an annular shoulder 17 at the inner end of the threaded portion 10 to provide a sealing connection between the flange and the cap to thereby prevent the leakage of air therebetween. The disk is apertured as at 19 and is provided with a lug 20 adapted to engage the valve pin 21 of the valve located in the valve stem 11 for opening the valve to admit air from the tire into the resilient member 12 when the cap 9 is screwed onto the valve stem.

Slidably arranged within the cap is a hollow indicator member 23 provided with a peripheral wall 24 which is open at one end and disposed about the resilient member 12 in normally spaced relation therewith when the tire is underinflated. The indicator member is provided with a top wall 25 having a hollow extension 26 guidedly disposed in an opening 27 in the end wall 15 of the cap. It will be understood that the extension 26 is disposed in outward visible relation when the tire is underinflated and after the tire is inflated to the desired pressure, the indicator member is forced downwardly into engagement with the resilient member 12 and retained in inward relation by the expanding action of the peripheral wall 24 against the inner face of the indicator member. The indicator member is thus retained in the inward position shown in Fig. 2 of the drawings so long as the tire is inflated to the desired pressure.

Interposed between the end wall 15 of the resilient member 12 and the end of the extension 26 is a coil spring 28 which is biased to a predetermined pressure. The predetermined pressure of the spring 28 functions to move the resilient member from the inward position shown in Fig. 2 to the outwardly exposed position shown in Fig. 1 when the pressure within the tire and in the resilient member 12 decreases to a point below the biased pressure of the spring.

In the form of the invention shown in Figs. 4 to 7 inclusive of the drawings, the cap 40 is similarly interiorly threaded as at 41 and located within the cap is a hollow resilient member 42 provided with an expansible and contractible peripheral wall 43 having a peripheral flange 44 at its inner end and with a relatively thick end wall 45.

The resilient member 42 is retained in position in the cap by means of a disk 46 similar to the disk 16 which is tightened against the peripheral flange 44 so as to compress the flange against the annular shoulder 47 to provide a sealing connection with the cap. The resilient member 42 is of annular formation in cross-section and is arranged within a cylindrical member 48. The cylindrical member 48 is formed with oppositely disposed extending slots 49 through which portions of the peripheral wall 43 of the resilient member expand when the tire is inflated as shown in Fig. 5 of the drawings.

In this form of the invention an indicator member 50 includes a cylindrical wall 51 and a top wall 52 having an upwardly extending hollow projection 53. The peripheral wall 51 is of elliptical formation in plan with the lower portion thereof surrounding the cylindrical member 48. The expanded portions of the peripheral wall 43 tightly engage against the peripheral wall 51 of the indicator member 50 when the indicator member is disposed in inward relation and the tire is inflated as shown in Fig. 5 of the drawings. The indicator member is retained in the inward position so long as the tire is inflated to the desired pressure. When, however, the pressure in the tire decreases below an under-inflated pressure, a coil spring 55 interposed between the top of the cylindrical member 48 and the end of the extension 53 functions to move the indicator member from the inward position to the projected visible position shown in Fig. 4 of the drawings.

Figure 7:
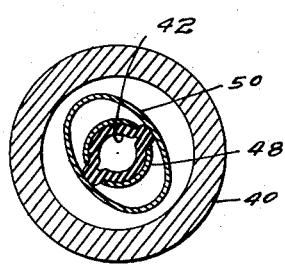
Fig. 7 is a similar view taken approximately on line 7—7 of Fig. 5.

The indicator member 50 is adapted to be manually rotated to tighten the same against the expanded portions of the peripheral wall 43 protruding through the slots 49 as shown in Fig. 7 of the drawings. The disk 46 is provided with a lug 56 adapted to engage the valve pin S of a valve stem 57 permitting air from the tire to the resilient member 42 through the openings 58 in the disk.

Figure 8:
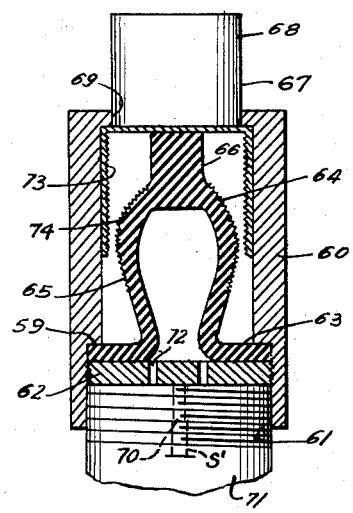
Fig. 8 is another modified form of the invention showing the indicator member in outwardly exposed relation.
Figure 9:
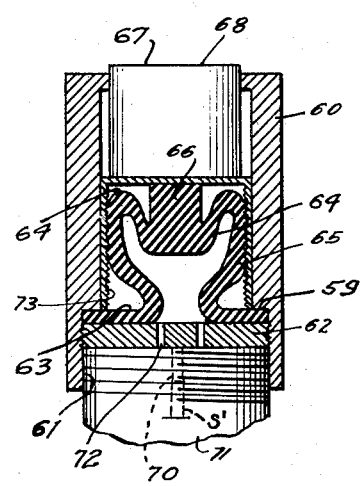
Fig. 9 is a similar view showing the indicator member in inward relation.

In the form of the invention shown in Figs. 8 and 9 of the drawings, the cap 60 is interiorly threaded as at 61 and threadedly engaged therein is a disk 62 for clamping the peripheral flange 63 of a resilient member 64 tightly against the peripheral shoulder 59. The resilient member 64 includes a peripheral wall 65 and a solid extension 66 at the upper end thereof. This form of the resilient member is adapted to be distorted to the form shown in Fig. 9 of the drawings by forcing the solid extension 66 inwardly. When in this position, the peripheral wall 65 of the resilient member 64 will expand against a hollow tubular member 67 when the tire is inflated to the desired pressure. The pressure of the peripheral wall 65 retains the indicator member 67 in inward relation as shown in Fig. 9 of the drawings and in the event the tire becomes under-inflated, the gripping action of the peripheral wall 65 against the inner periphery of the indicator member 67 will be reduced so as to release the indicator member, whereupon the upward expansive action of the resilient member 65 will force the indicator member to the outward visible position shown in Fig. 8 of the drawings. The indicator member 67 slidably fits the cap 60 and is formed with an extension 68 which slidably fits the opening 69 in the end of the cap.

The disk 62 is formed with a projection 70 adapted to engage the valve pin S' of a valve stem 71 permitting air to the resilient member 64 through the openings 72 in the disk.

The inner face of the peripheral wall of the indicator member 67 tapers inwardly towards the opening end thereof and is preferably serrated or ribbed as at 73, while the outer periphery of the resilient member 64 is similarly serrated or ribbed as at 74 to provide increased frictional engagement between the indicator member 67 and the resilient member 64. In this form of the invention as well as in the other forms of the invention, the indicator member 67 is forced inward into engagement with the resilient member 64 after the tire has been expanded to the desired pressure. The indicator member will be retained in such inward position by the gripping action therewith of the expanded resilient member 64 until the pressure within the tire decreases to reduce the gripping action of the resilient member with the indicator member, whereupon the indicator member will be moved to the outward visible position.

While the preferred forms of the invention have been shown and described herein, it is to be understood that the invention is not so limited but shall cover and include any and all modifications thereof which fall within the purview of the invention.

What is claimed is:

1. A pressure indicator for engagement with the valve stem of a pneumatic tire for indicating the pressure in the tire, said pressure indicator including a cap having an apertured top wall and a threaded end for securing the same on the valve stem of the tire, a resilient member having a top wall, a peripheral wall and a flange extending outwardly from said peripheral wall, means sealingly securing said resilient member in said cap, said means including an apertured member threadedly secured in said cap and having a lug disposed in engagement with the valve in the valve stem for admitting air from the tire to said resilient member for expanding the same, a slide member having a peripheral wall located wholly within said cap and extending about the peripheral wall of said resilient member and having a free end projecting through the opening in the top wall of the cap, said slide member being depressible into frictional engagement with the peripheral wall of said resilient member and retained in said depressed relation when the resilient member is expanded thereagainst by the pressure of the tire, and means arranged within said slide member for moving said slide member with the free end thereof in outwardly projecting relation when the air in the tire is decreased so as to reduce the pressure of the resilient member against said slide member.

2. A pressure indicator for engagement with the valve stem of a pneumatic tire for indicating the pressure in the tire, said pressure indicator including a cap having an apertured top wall and a threaded end for securing the same on the valve stem of the tire, a resilient member having a top wall, a peripheral wall and a flange extending outwardly from said peripheral wall, means sealingly securing said resilient member in said cap, said means including an apertured member threadedly secured in said cap and having a lug disposed in engagement with the valve in the valve stem for admitting air from the tire to said resilient member for expanding the same, a slide member having a peripheral wall located wholly within said cap and extending about the peripheral wall of said resilient member and having a free end projecting through the opening in the top wall of the cap, said slide member being depressible into frictional engagement with the peripheral wall of said resilient member and retained in said depressed relation when the resilient member is expanded thereagainst by the pressure of the tire, and means arranged within said slide member and biased between said slide and resilient members for moving said slide member with the free end thereof in outwardly projecting relation when the air in the tire is decreased so as to reduce the pressure of the resilient member against said slide member.

3. A pressure indicator for engagement with the valve stem of a pneumatic tire for indicating the pressure in the tire, said pressure indicator including a cap having an apertured top wall and a threaded end for securing the same on the valve stem of the tire, a resilient member having a top wall, a peripheral wall and a flange extending outwardly from said peripheral wall, means sealingly securing said resilient member in said cap, said means including an apertured member having a lug disposed in engagement with the valve in the valve stem for admitting air from the tire to said resilient member for expanding the same, a slide member having a peripheral wall located wholly within said cap and extending about the peripheral wall of said resilient member and having a free end projecting through the opening in the top wall of the cap, said slide member being depressible into frictional engagement with the peripheral wall of said resilient member and retained in said depressed relation when the resilient member is expanded thereagainst by the pressure of the tire, and spring means arranged within said slide member for moving said slide member with the free end thereof in outwardly projecting relation when the air in the tire is decreased so as to reduce the pressure of the resilient member against said slide member.

4. A pressure indicator for engagement with the valve stem of a pneumatic tire for indicating the pressure in the tire, said pressure indicator including a cap having an apertured top wall and a threaded end for securing the same on the valve stem of the tire, a hollow resilient member arranged in said cap, means sealingly securing said resilient member in position therein, said means including an apertured member disposed in engagement with the valve in the valve stem for admitting air from the tire to said resilient member for expanding the same, a slide member having a peripheral wall located wholly within said cap and extending about said resilient member and having a free end protruding through the opening in the top wall of the cap, said slide member being depressible into frictional engagement with the resilient member and retained in said depressed relation when the resilient member is expanded thereagainst by the pressure of the tire, and means for moving said slide member with the free end thereof in outwardly projecting relation when the air in the tire is decreased so as to reduce the pressure of the resilient member against said slide member.

5. A pressure indicator for engagement with the valve stem of a pneumatic tire for indicating the pressure in the tire, said pressure indicator including a cap having an apertured top wall and a threaded end for securing the same on the valve stem of the tire, a hollow resilient member arranged in said cap, means sealingly securing said resilient member in position therein, said means including an apertured member having a lug disposed in engagement with the valve in the valve stem for admitting air from the tire to said resilient member for expanding the same, a slide member having a peripheral wall located wholly within said cap and extending about said resilient member and having a free end protruding through the opening in the top wall of the cap, said slide member being depressible into frictional engagement with the resilient member and retained in said depressed relation when the resilient member is expanded thereagainst by the pressure of the tire, and spring means arranged within said slide member and interposed between the slide and resilient members for moving said slide member with the free end thereof in outwardly projecting relation when the air in the tire is decreased so as to reduce the pressure of the resilient member against said slide member.

6. A pressure indicator for engagement with the valve stem of a pneumatic tire for indicating the pressure in the tire, said pressure indicator including a cap having an apertured top wall and a threaded end for securing the same on the valve stem of the tire, a hollow resilient member arranged in said cap, means sealingly securing said resilient member in position therein, said means including an apertured member disposed in engagement with the valve in the valve stem for admitting air from the tire to said resilient member for expanding the same, a cylindrical member having a peripheral wall formed with a plurality of slots through which slots portions of the resilient member are adapted to protrude when the resilient member is expanded, a slide member having a peripheral wall located wholly within said cap and extending about said cylindrical member and having a free end protruding through the opening in the top wall of the cap, said slide member being depressible into frictional engagement with the portions of said resilient member protruding from said slots for retaining said slide member in depressed relation when the resilient member is expanded thereagainst by the pressure of the tire, and spring means arranged within said slide member and interposed between the slide and cylindrical members for moving said slide member with the free end thereof in fully projected relation through the top wall of the cap when the air in the tire decreases so as to reduce the pressure of the resilient member against said slide member.

References Cited in the file of this patent

UNITED STATES PATENTS

| | | |
|---|---|---|
| 2,193,841 | Renner | Mar. 19, 1940 |
| 2,570,108 | Gallot | Oct. 2, 1951 |